H. Whitney,
Show Bottle.

No. 88,105.  Patented Mar. 23, 1869.

WITNESSES:

INVENTOR:
H. Whitney
by his attorney
R. H. Eddy.

HENRY WHITNEY, OF EAST CAMBRIDGE, MASSACHUSETTS.

*Letters Patent No. 88,105, dated March 23, 1869.*

IMPROVED SHOW-BOTTLE.

The Schedule referred to in these Letters Patent and making part of the same.

*To all persons to whom these presents may come:*

Be it known that I, HENRY WHITNEY, of East Cambridge, in the county of Middlesex, and State of Massachusetts, have made a new and useful Invention, having reference to Apothecaries' Show-Bottles; and I do hereby declare the same to be fully described in the following specification, and represented in the accompanying drawings, of which—

Figure 1:
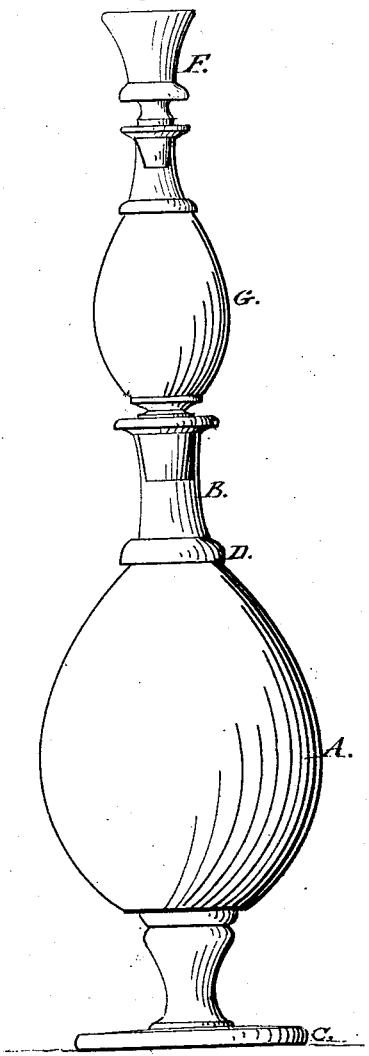

Figure 1 is a front elevation, and

Figure 2:
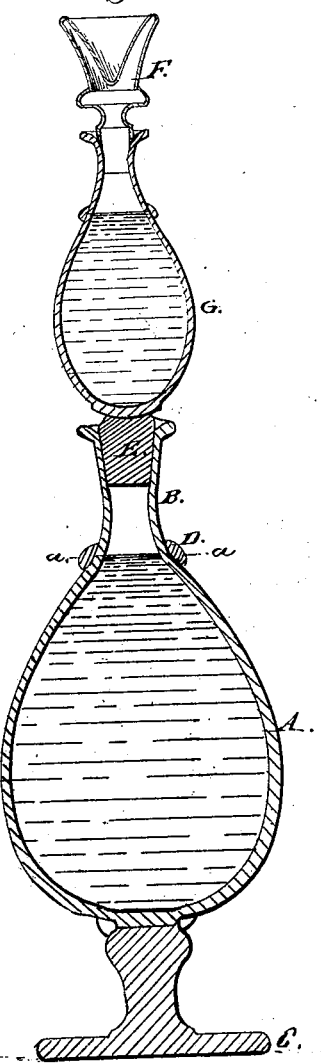

Figure 2, a vertical section of a set of show-bottles as made in accordance with my invention.

Apothecaries' show-bottles are such as are usually placed at the windows of their stores, and filled with fluids of different colors, in order to diffuse colored rays of light, and attract the attention of persons. These bottles have heretofore been constructed of transparent or uncolored glass, which, in order to prepare them for use, has rendered it necessary to either wholly or partially fill each of them with a colored liquid. These liquids are liable to evaporate, and deposit a sediment on the inner surface of the bottle, or to become more or less cloudy, or to fade in color, thus occasioning care and attention, as well in the matter of cleansing the bottles as in the preparation of the liquids for them. The making of the liquids is also attended with considerable expense and labor.

My invention, by dispensing with the use of colored liquid in the bottles, avoids the expense, labor, and difficulties incident to the manufacture and employment of such liquids.

In carrying out my invention, I blow, or make the body-portion of the bottle of colored glass, and the neck of transparent, or uncolored glass. The foot may also be made of uncolored glass. The neck and body, I make separately, and, having heated the two where they are to be joined, so that, when put together, they will adhere, I bring into contact the edges of the parts so heated, and, by means of glass-makers' tools, I work the parts into their proper shape, so that their inner and outer surfaces may coincide at the junction. Instead of so making the neck and body, the former may be first made or blown from the end of a glass-blower's blow-pipe. To the free end of the neck, a mass of molten colored glass may be attached, after which it may be blown into the shape of the body by a workman, by blowing through the pipe and neck.

After the formation of the uncolored neck and the colored body, and their fixation together by either of the modes above mentioned, I next encompass the joint with a layer, or collar of glass, in a molten state, causing the same to adhere to the body and neck, and cover and hide the irregularities of the joint, and aid in effecting the conjunction of the parts, or in giving strength thereto.

The foot, when one is used, I previously or afterward fix to the body. Such foot I make of uncolored glass.

The body may be composed entirely of colored glass, or it may be made of uncolored glass, glazed, either on the inside or the outside of it, with colored glass, in a manner well known to persons skilled in the art of glass-blowing.

In the drawings—

A denotes the colored body;

B, the uncolored neck;

C, the foot;

D, the glass collar; and

*a a*, the line of junction of the body and neck.

E is a stopple, fixed to and projecting from the bottom of another and smaller bottle, G, having a different-colored body, and an uncolored neck, and made, in all respects, as hereinbefore described, such bottle being provided with a stopper, F, to fit to its neck.

In making bottles, it has been customary heretofore to blow the neck and body in one entire piece of glass. I am not aware that an apothecary's show-bottle has ever been constructed with its neck made of a separate piece of uncolored glass from the body, and afterward fire-heated, and made to adhere to the body made of colored glass, and the joint afterward covered and strengthened by a collar of molten glass run around and formed on it; nor am I aware that an apothecary's show-bottle has ever been made, before my invention, with a colored body and an uncolored neck, or with the same and a colored or an uncolored foot, the color of the body being designed to represent that of a liquid as usually employed in an apothecary's show-bottle.

What I claim, therefore, as my invention, and desire to secure by Letters Patent, is—

As a new article of manufacture, an apothecary's show-bottle, made as hereinbefore described, with the body of a glass of one color, and the neck of uncolored, or transparent glass, and their junction covered and strengthened as set forth.

HENRY WHITNEY.

Witnesses:
GEO. D. NOYES,
F. P. HALE, JR.